Jan. 16, 1951  H. J. GRAHAM  2,537,990
ELECTRICAL WELDING APPARATUS
Filed June 1, 1949

Inventor
Harold J. Graham
by Roberts, Cushman & Grover
Att'ys.

Patented Jan. 16, 1951

2,537,990

UNITED STATES PATENT OFFICE 2,537,990

ELECTRICAL WELDING APPARATUS

Harold J. Graham, Highland Park, Mich., assignor to Graham Manufacturing Corporation, Detroit, Mich., a corporation of Michigan Application June 1, 1949, Serial No. 96,418

8 Claims. (Cl. 219—4)

This invention relates to an electrical welding and piercing system of the type wherein a mechanical impact tending to unite two construction elements is applied together with a current impulse.

One of the principal objects of this invention is to provide equipment of the above-mentioned type, particularly equipment similar to that shown in my copending application Serial No. 700,136 now Patent No. 2,510,101 issued June 6, 1950 of which this is a continuation in part, whose impact applying component is normally disconnected from the source of electric welding energy and which depends for establishment upon an operative electrical connection not upon the blow impact between its percussion elements, but separates the circuit preparing switching function from the blow or percussion function.

Other objects are to provide in equipment of this type for positive correlation of a lower work piece and a stationary work piece or tool element without direct contact; to provide a tool which is suitable not only for welding but also for piercing; to provide a tool which is especially suited for welding studs to a stationary work piece; to provide a tool which is for its current supply independent of internal contact making devices; to provide a percussion welding tool that can be easily adapted for operation by a contact maker separated therefrom and associated with an automatic control system; to provide a welding system including a percussion welding tool and a circuit particularly suited according to the invention for operation of tools of this type; to provide welding equipment which incorporates a tool with normally restrained impact means imparting a blow to initially separate pieces to be joined with the welding current flowing therethrough immediately upon the contact of the pieces and generally to provide percussion welding and piercing equipment which is simple, safe, inexpensive, easily serviceable and yet reliable and adaptable fully to comply with the requirements of a wide variety of applications.

In one aspect, the tool according to the invention accomplishes these objects by means of two relatively sliding members which are connected by an energy supplying element, for example a spring, and one of which carries a hammer or plunger which is normally attached to its slide but releases therefrom upon the movement of the slides towards each other, the hammer carrying the slide also carrying a force transmitting sliding element so that the hammer or plunger, when released from its slide applies a percussion blow to the transmitting element.

In another aspect one of the slide members is provided with a distancer which permits application of the tool by supporting it against one of the work pieces to be joined, such as a stationary piece, while releasing the percussion and contact making elements and performing the welding or piercing operation by pressing the other slide member towards the fixed work piece; in still another aspect, the invention provides for a piercing operation by using in the above characterized welder, supplied from a suitable circuit according to the invention, a tool which has a tip of non-welding material for example tungsten and which, instead of being joined to a work piece, maintains an arc and penetrates the work piece, whereupon the welding tool can be withdrawn, the arc having been extinguished through the collapse of the charge of a capacitor in the supply circuit, or opening of the circuit by a switch means provided for that purpose.

An additional aspect of the invention is a welding installation as a whole including a tool according to the invention in combination with safety switch means that normally disconnect the tool from its supply circuit which may contain energy storing such as capacitor means; and installations having the tool connected ready for automatic closing of the contacts in series with the safety switch which is separate from the tool in combination with a circuit which automatically prepares the welding circuit by means of a voltage responsive element when the required energy is available, closes it for welding operation proper to the work pieces, and automatically opens the welding circuit by way of a switch element responsive to the welding current surge; and an installation which precludes welding and protects the equipment and operator if the pieces to be joined should make contact prior to the desired percussion impact.

A further feature of the invention is means incorporated in the supply circuit for reducing the voltage thereof to a predetermined value when the capacitor means is charged to such voltage. In a more specific aspect the supply circuit includes a direct current power source connected in parallel with the winding of a potentiometer having an adjustable tap which is connected to the normally open contact of a voltage sensitive relay. The normally closed contact of the relay connects a capacitor supplying the surge of welding energy with the direct current power source so that the capacitor is charged from such source. The operating solenoid of the relay is connected in parallel with the capacitor whereby the solenoid transfers the contacts to disconnect the capacitor when the capacitor becomes charged to a predetermined voltage and concomitantly connects the capacitor in parallel with a portion of the potentiometer selected by adjusting the tap so that the capacitor is maintained charged to the predetermined voltage by means of energy supplied by the voltage drop across the potentiometer portion.

These and other objects, aspects and features will be apparent from the following description of an illustrative specific embodiment of the invention referring to a drawing in which.

Figure 1:
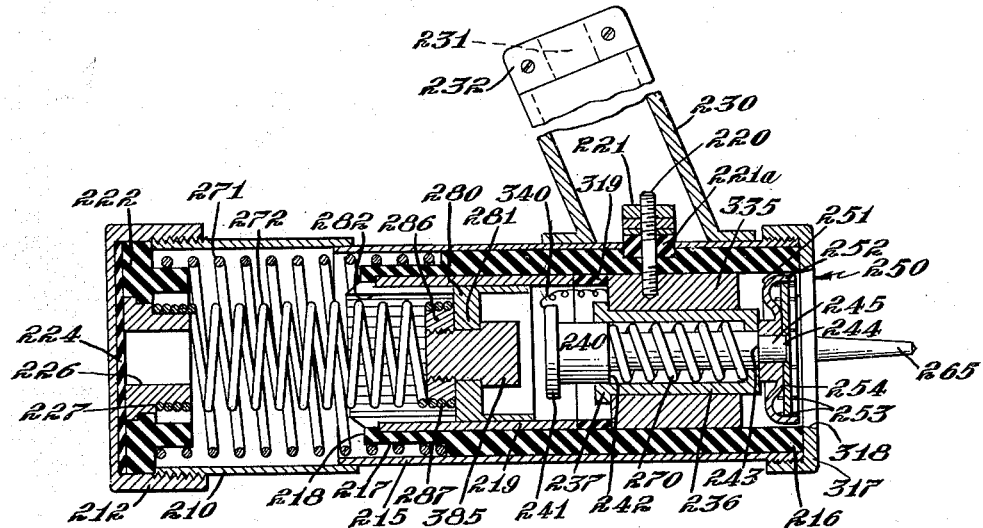
Fig. 1 is a longitudinal section through a welding gun or tool according to the invention.

In the specific embodiment chosen for the purpose of illustration a welding tool or gun (Fig. 1) comprises a cap 212 which is screwed to a metal tube 210 constituting a housing which holds against the cap 212, a block 222 and a disk 224 of insulating material which in its turn holds a metal tube 226 having a spring thread 227. Within tube 210 slides another metallic tube or plunger casing 215, which is lined with a tube 216 of insulating material which has at its lower end a recessed portion 217. This narrower portion has an inner rim 218 against which rests a metallic tube 219 which is secured with respect to tubes 216 and 215 by means of an insulating tube 319. Pressed into tube 216 and abutting against the insulating tube 319 is a hammer carrying tube 335 which holds a metal sleeve 236 with a flange 237. The hammer carrying tube 335 is fastened by a bolt 220 with appropriate nuts 221 and an insulating washer 221a, which bolt serves as an electrical conductor connecting tube 335 with a flexible wire introduced through a protective housing 230 attached to plunger casing 215 and having a grommet opening 231 with a cover 232.

Figure 2:
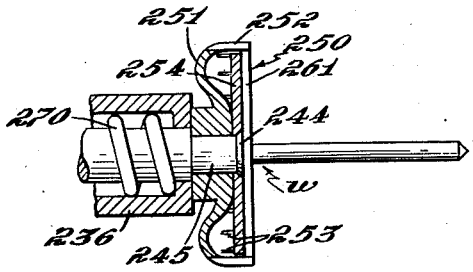
Fig. 2 is an elevation of a stud inserted in its chuck which is shown in section, which stud is particularly suited for use with the tool.

Within sleeve 236 is slidingly inserted a percussion block 240 having an impact head 241, a shoulder portion 242 and a chuck shoulder portion 243. For example, by means of a sunk rivet 244 (Fig. 2), the chuck shank 245 holds a chuck 250 against shoulder 243. The chuck 250 consists of a cup disk 251 which has an annular rim 252 provided with saw cuts 253, and a plate 254. This chuck is especially appropriate for holding a disk stud $w$ of the type shown in Fig. 7, of my copending application Serial No. 700,136. The disk portion 261 of the stud is held in the chuck simply by inserting it into ring portion 252, slightly expanding the yielding saw cut portions which thereupon hold stud disk pressed against the chuck plate 254.

The tube 216 is confined within plunger housing tube 215 by means of a cap 317 which has an opening 318 and may be provided with two diametrical spacers 265. A spring 270 retains the chuck within the tube 216 by pressing chuck base 251 against sleeve 236, the above mentioned opening 318 in cap 317 being large enough to permit exit of the chuck from within tube 216.

Within metal tube 219 slides a plunger 280 which has a core portion 281, and several latch springs 282, which in normal position lock the plunger against the inwardly protruding edge of metal tube 219. A hammer piece 385 is held against the core 281 by means of a nut 286 which is on the outside provided with a spring thread 287. By means of the corresponding thread 227, a spring 272 is fastened between plunger 280—385 and metal tube 226. Another spring 271 is inserted between block 222 and the tube 216, normally slightly tending to move tubes 210 and 215 apart, against the tension of spring 272, thus retaining these housing members in the relative position shown in Fig. 1.

This welding tool operates as follows. Contact stud 220 and a stationary work piece W are connected to an appropriate current supply source as will be described in detail hereinafter; and a disk stud $w$ is inserted in chuck 250. It will be evident that with the stud 220 so connected welding current reaches the hammer member 243 directly through stud 220, sleeve 335, and spring casing 236 within which plunger 243 slides. Although this precaution is in most instances unnecessary, a flexible conductor 340 may be provided between sleeve 335 and plunger face 241, as indicated in Fig. 1. Spacers 265 are then pressed against the large stationary or otherwise fixed work piece W to which stud $w$ is to be welded. The spacers 265 are somewhat longer than the stud $w$ so that the latter is slightly distanced from the work piece. Pressure is then applied against cap 212, which may be provided with a handle, until the inner edge of block 222 forces latch springs 282 inwardly, thereby releasing plunger 280 which is then forcibly moved towards block 240. The hammer 385 thereupon impacts head 241, forcing the stud $w$ towards the piece W to which it is to be welded with the chuck 250 emerging slightly from cap 317, against the pressure of spring 270.

The welding takes place as above described, and upon release of pressure against cap 212, the spring withdraws plunger 280—281 until latches 282 again engage sleeve 219. Spring 270 thereupon withdraws hammer member 240, disengages the chuck rim 251 from the stud disk 261. The welding tool is thereupon ready for insertion of another stud and the next welding operation.

Figure 3:
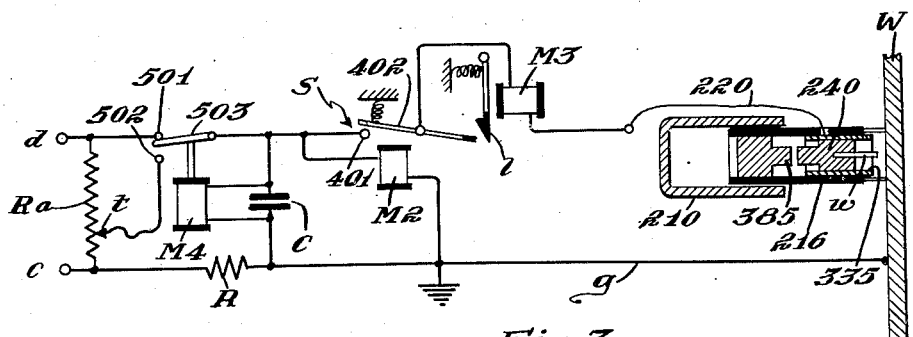
Fig. 3 is the wiring diagram of a circuit to be used in connection with the tool.

A preferred power supply circuit for the welding gun described heretofore is shown in Fig. 3. One terminal of an electric energy supply such as the capacitor C is connected by the conductor $g$ to the large stationary work piece W. The other terminal of the capacitor C is coupled to the stud 220 by means of the normally open contacts S of a voltage sensitive relay M2 and the current sensitive solenoid M3.

The capacitor C is charged from the terminals $d$ and $c$ of a direct current power source (not shown). One terminal of the capacitor C is connected to the power source terminal $c$ by a current limiting resistor R, the other capacitor terminal being linked to the power source terminal $d$ by the normally closed contacts 501—503 of a voltage sensitive relay M4, the solenoid of which is connected in parallel with the capacitor C. The normally open contact 502 of the relay M4 is connected to an adjustable tap $t$ of a voltage divider such as the potentiometer Ra which is connected across the power source terminals $d$ and $c$. The tap $t$ is adjusted so that the potential drop across the portion of the potentiometer between the tap and the power source terminal $c$ is equal to the required welding voltage. Such voltage depends upon the size and material of the pieces to be welded and is therefore best determined empirically.

Whenever the energy stored in the capacitor C is such that less than the welding voltage predetermined as above appears between the terminals thereof, the force exerted by the solenoid of the relay M4 is not sufficient to open the normally closed contacts 501—503 so that the rate at which energy is supplied to the capacitor C from the power source terminals $d$ and $c$ is limited only by the resistor R.

Whenever the capacitor C has sufficient charge so that the predetermined voltage appears across its terminals and therefor across the solenoid of the relay M4, the relay contacts transfer, the normally closed contacts 501—503 opening to interrupt the capacitor charging circuit described above. The normally open contacts 502—503 conjointly close thereby connecting the capacitor C in parallel with the portion of the potentiometer Ra between the power source terminal c and the tap t. In this manner any losses from the capacitor C during standby periods between welding cycles are replaced by energy supplied by the voltage drop across the potentiometer portion so that the capacitor is maintained fully charged at all times.

The switch S is associated with and operated by solenoids M2 and M3 as follows. Contacts 401—402 of switch S are normally open, but closed when voltage solenoid M2 is energized, whereupon contact 402 is retained in closed position by latch l, provided that solenoid M3 is de-energized, with w and W separated. Energization of solenoid M3 retracts latch l, releasing contact 402 and opening switch S. Contact 402 is connected, through solenoid M3, as described above to terminal stud 220 of the welding tool. Solenoid M2 is connected between the two capacitor terminals, one of which is grounded and connected to the stationary welding piece, at g.

This arrangement operates as follows. When capacitor C has attained its proper charge determined for the purpose at hand, solenoid M2 closes switch S which is thereupon locked by latch l. The welding circuit is now fully prepared and the weld is made when stud w touches work piece W after hammer 385 is released from its holding latches 282. The welding current surge energizes solenoid M3 which attracts latch l, permitting switch S to open. The capacitor C thereupon charges again and, upon the proper charge of C having been reached, the tool is again ready for operation.

It should be understood that the present disclosure is for the purpose of illustration only and that this invention includes all modifications and equivalents which fall within the scope of the appended claims.

I claim:

1. Electric welding apparatus comprising electric energy supply means including energy storing means of the type re-establishing operative voltage after discharge, means for positioning two work pieces to be joined relatively to each other in place for welding but at a distance preventing direct contact therebetween, impact means for bringing said pieces into force transmitting contact, conductor means for electrically connecting said pieces to respective terminals of said supply means, normally separated contacts arranged in series connection in said conductor means for preparing when closed a welding circuit independently of said force transmitting impact contact, and voltage responsive relay means connected to said storing means for closing said contacts independently of and prior to said impact contact upon reestablishing of said operative voltage.

2. Apparatus according to claim 1 further comprising means responsive to the welding surge current for opening said contacts.

3. Electric welding apparatus comprising electric energy supply means having output terminals, means for positioning two work pieces to be joined relatively to each other in place for welding but at a distance preventing direct contact therebetween, impact means for bringing said pieces into mechanical contact, conductor means for electrically connecting said pieces to respective terminals of said supply means, normally separated contacts arranged in series connection in said conductor means for preparing a welding circuit by closing said conductor means, and a relay actuated by said supply means to close said contacts when the voltage across said terminals reaches a predetermined value.

4. Electric welding apparatus comprising direct current supply means, capacitor means connected to said supply means, means for positioning two work pieces to be joined relatively to each other in place for welding but at a distance preventing direct contact therebetween, impact means for forcing said pieces into mechanical contact, conductor means for electrically connecting said pieces to respective terminals of said supply means, normally separated contacts arranged in series connection in said conductor means, and voltage responsive relay means for closing said contacts to prepare a welding circuit upon said capacitor means becoming charged to a predetermined voltage independently of said forcing of said mechanical contact.

5. Electric welding apparatus comprising direct current supply means, capacitor means connected to said supply means, means for positioning two work pieces to be joined relatively to each other in place for welding but at a distance preventing direct contact therebetween, impact means for forcing said pieces into mechanical contact, conductor means for electrically connecting said pieces to respective terminals of said supply means, normally separated contacts arranged in series connection in said conductor means, voltage responsive relay means for closing said contacts to prepare a welding circuit upon said capacitor means becoming charged to a predetermined voltage independently of said forcing of said mechanical contact, a detent for maintaining the contacts in the closed position, and a current responsive solenoid connected in series with said conductor means for releasing said detent upon the surge of welding current through said conductor means.

6. Electric welding apparatus comprising energy supply means, capacitor means connected to said supply means, means for reducing the voltage of the supply means to a predetermined value when the capacitor means is charged to the voltage of said value, means for positioning two work pieces to be joined relatively to each other in place for welding but at a distance preventing direct contact therebetween, means for bringing said pieces into mechanical contact, conductor means for electrically connecting said pieces to respective terminals of said supply means, normally separated contacts arranged in series connection in said conductor means, and voltage responsive relay means for closing said contacts to prepare a welding circuit upon said capacitor means becoming charged to the predetermined voltage independently of said mechanical contact.

7. Electric welding apparatus comprising energy supply means including a direct current source; a capacitor charged from said source; a potentiometer having an intermediately tapped winding connected in parallel with said source; a relay having normally closed contacts connecting the capacitor to said power source, normally open contacts linked with the potentiometer tap for connecting the capacitor in parallel with a portion of the potentiometer winding selected so that a voltage drop equal to a predetermined welding voltage is developed thereacross, and a voltage sensitive solenoid connected in parallel with said capacitor for operating the contacts only when a voltage equal to the predetermined voltage is impressed thereupon; whereby said solenoid opens said normally closed contact to disconnect the capacitor from the source when the capacitor becomes charged to the predetermined voltage and concomitantly closes the normally open contacts to connect the capacitor in parallel with the selected portion of said potentiometer winding so that the capacitor is maintained charged to said predetermined voltage by energy supplied by the voltage drop across said potentiometer winding portion; means for positioning two work pieces to be joined relatively to each other in place for welding but at a distance preventing direct contact therebetween; conductor means for electrically connecting said pieces to respective terminals of said supply means; normally separated welding contacts arranged in series connection in said conductor means; and voltage responsive relay means for closing said welding contacts to prepare a welding circuit upon said capacitor becoming charged to the predetermined voltage.

8. Electric welding apparatus comprising energy supply means including a direct current power source; a capacitor charged from said source; a potentiometer having an intermediately tapped winding connected in parallel with said source; a relay having normally closed contacts connecting the capacitor to said power source, normally open contacts linked with the potentiometer tap for connecting the capacitor in parallel with a portion of the potentiometer winding selected so that a voltage drop equal to a predetermined welding voltage is developed thereacross, and a voltage sensitive solenoid connected in parallel with said capacitor for operating the contacts only when a voltage equal to the predetermined voltage is impressed thereupon; whereby said solenoid opens said normally closed contacts to disconnect the capacitor from the source when the capacitor becomes charged to the predetermined voltage and concomitantly closes the normally open contacts to connect the capacitor in parallel with the selected portion of said potentiometer winding so that the capacitor is maintained charged to said predetermined voltage by energy supplied by the voltage drop across said potentiometer winding portion; means for positioning two work pieces to be joined relatively to each other in place for welding but at a distance preventing direct contact therebetween; impact means for forcing said pieces into mechanical contact; conductor means for electrically connecting said pieces to respective terminals of said supply means; normally separated contacts arranged in series connection in said conductor means; voltage responsive relay means for closing said contacts to prepare a welding circuit upon said capacitor means becoming charged to the predetermined voltage independently of said forcing of said mechanical contact; a detent for maintaining the contacts in the closed positions; and a current responsive solenoid connected in series with said conductor means for releasing said detent upon the surge of welding current through said conductor means.

HAROLD J. GRAHAM.

REFERENCES CITED

The following references are of record in the file of this patent:

FOREIGN PATENTS

| Number | Country | Date |
| --- | --- | --- |
| 580,854 | Great Britain | Sept. 23, 1946 |